United States Patent [19]
Haworth et al.

[11] Patent Number: 4,825,689
[45] Date of Patent: May 2, 1989

[54] SENSING DEVICE

[75] Inventors: Roy Haworth, Greenford; Michael F. Russell, Chalfont St. Peter, both of England

[73] Assignee: Lucas Industries Public Limited Company, Birmingham, United Kingdom

[21] Appl. No.: 253,948

[22] Filed: Oct. 3, 1988

Related U.S. Application Data

[63] Continuation of Ser. No. 943,374, Dec. 16, 1986, abandoned.

[30] Foreign Application Priority Data

Jan. 25, 1986 [GB] United Kingdom ............... 8601842

[51] Int. Cl.$^4$ ........................................... G01M 15/00
[52] U.S. Cl. .................................................... 73/116
[58] Field of Search .................... 73/117.3, 117.2, 116; 250/227

[56] References Cited

U.S. PATENT DOCUMENTS

| 4,192,574 | 3/1980 | Henry et al. | 250/227 |
| 4,337,648 | 7/1982 | Gillespie | 73/117.3 |
| 4,409,815 | 10/1983 | Burkel et al. | 73/116 |
| 4,422,323 | 12/1983 | Linder et al. | 73/116 |
| 4,441,021 | 1/1984 | Olson et al. | 73/117.3 |
| 4,493,208 | 1/1985 | Grover | 73/117.3 |
| 4,554,927 | 11/1985 | Fussell | 73/714 |
| 4,592,664 | 6/1986 | Bijlenga et al. | 250/227 |
| 4,648,266 | 3/1987 | Ikeda | 73/117.3 |
| 4,665,740 | 5/1987 | Matsumoto et al. | 73/116 |

FOREIGN PATENT DOCUMENTS 436991 12/1974 U.S.S.R. ............... 73/116

Primary Examiner—Stewart J. Levy
Assistant Examiner—Robert R. Raevis
Attorney, Agent, or Firm—Balogh, Osann, Kramer, Dvorak, Genova & Traub

[57] ABSTRACT

A sensing device for use in an internal combustion engine to sense combustion of fuel in a combustion chamber of the engine includes a tubular body part in which is located a radiation conductive element one end of which is exposed to the combustion chamber in use. On the other end of the element is a sensor which in use is connected in an electrical circuit. The sensor is responsive to radiation transmitted along the element from the flame in the combustion chamber. The element is held in a bore of the body part by a visco-elastic lining which also provides a gas tight seal and acts to cushion the element against vibration.

7 Claims, 1 Drawing Sheet

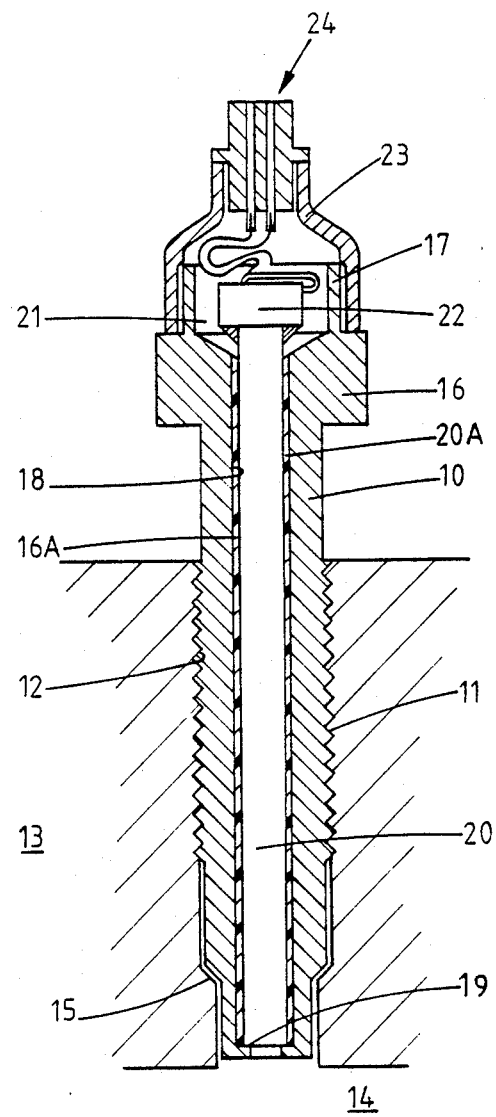

SENSING DEVICE

This application is a continuation of application Ser. No. 943,374, filed Dec. 16, 1986, now abandoned.

This invention relates to a sensing device whereby an electrical signal indicative of the combustion of fuel in a combustion space of an internal combustion engine can be obtained.

Various forms of such device are known such for example as radiation responsive devices which are responsive to the radiation emitted by the burning fuel, pressure responsive devices which are responsive to the increase in pressure which occurs in the combustion space following ignition of the fuel and ionization sensing devices which are responsive to the free ions in the flame front in the combustion space.

The present invention is concerned with radiation responsive devices. It is known to observe and indeed to photograph the fuel combustion process within an engine combustion space through a quartz window formed in the wall of the combustion space. Observation in this manner over an extended period of engine use does however become more difficult due to the deposition of soot on the window and the possible damage to the surface of the window exposed to the combustion space. It is nevertheless possible to locate a suitable sensor behind the window and this will, for an initial period of engine use, provide a signal indicative of the start of combustion of fuel.

A more advanced system is known from U.S. Pat. No. 4,461,170 in which a sensor is associated with a fuel injection nozzle which supplies fuel to the combustion space. The sensor is connected by means of a light transmitting path which may comprise a bundle of optical fibres, to a fuel supply gallery of the nozzle and from which the nozzle outlet extends. The outlet is controlled by the valve member of the nozzle so that in addition to its normal function it also acts as a switch to isolate the sensor and in particular the end of the light transmitting path remote from the sensor, from the combustion space except when fuel is being delivered to the space. The aforesaid problems of deposition of soot and damage are therefore overcome. However, the outlet from the nozzle is extremely small so that the amount of light entering the light path will be very small and this requires that the sensor must be responsive to the small amount of light and the associated amplifiers must provide sufficient amplification to enable effective use to be made of the signal. In addition, the light sensitive path must be sealed against the very high fuel pressure which will exist in the fuel supply gallery during injection of fuel.

The object of the present invention is to provide a sensing device of the radiation responsive type in a simple and convenient form.

According to the invention a sensing device for attachment to an internal combustion engine whereby an electrical signal can be obtained indicative of combustion of fuel in a combustion space of the engine comprises in combination, a tubular body part adapted to be secured within an opening in the wall of the combustion space, a radiation conductive element extending within a bore defined by the tubular member, a sealing lining located between the surface of said element and the wall of the bore, said lining acting to retain the element in the bore and to prevent egress of gases from the combustion space, and a sensor mounted at the end of the element which is remote from the combustion space in use, said sensor being responsive to the radiation transmitted by the element, the other end of the element in use, being exposed to the combustion space.

An example of a sensing device in accordance with the invention will now be described with reference to the accompanying drawing which is part sectional side elevation of the device shown mounted in the wall of a cylinder head of an engine.

Referring to the drawing there is indicated at 10 a tubular body part which is formed from metal and which has a screw threaded portion 11 formed on its peripheral surface for engagement with complementary screw threads formed in an opening 12 in the cylinder head 13 of the engine. The opening 12 at its inner end communicates with a combustion space 14 of a reciprocating piston engine and adjacent the inner end of the opening the latter is provided with a tapered step 15 which is engaged by a complementary step on the peripheral surface of the body part to establish a gas tight seal.

The body part has an enlarged head portion 16 upstanding from which is a hollow flange 17.

The body part defines a bore 18 which opens into the combustion chamber 14 when the body part is secured within the opening and which is provided at its end adjacent the combustion space with a step 19. The step 19 is engaged by one end of a radiation conductive element 20 and this extends through the bore into a chamber 21 which is bounded by the flange 17. In order to secure the element within the bore and also to provide a seal between the surface of the element and the wall of the bore, a lining 20A is provided which is formed from a visco-elastic material such as a silicone rubber. Besides providing the retaining and sealing action, the lining has the very important function of protecting the element 20 against engine vibration, damping any vibration which occurs in the element, and also insulating the element against mechanical shock which may occur for example during the fitting of the sensing device to the engine. The element can be formed from quartz having flame polished end surfaces. It is only necessary to break the rod to the required length and to anneal the ends thereof in a flame.

Mounted on the end of the element which lies within the chamber 21 is a sensor 22 and this conveniently is a photo-diode or diodes, which has its light opening facing the end of the element. The diode is cemented to the end of the element but in carrying out the cementing process care must be taken to ensure that no cement is deposited on the end surface of the rod and a fillet type of joint is preferred as is illustrated.

An end cap 23 is provided to close the end of the chamber 21, the cap being in screw thread engagement with the flange 17. The cap also mounts an electrical connector plug generally indicated at 24 which is connected to the terminals of the diode by means of insulated conductors. Following assembly the chamber 21 may be filled with potting compound and the threads between the end cap and flange locked with a suitable locking compound.

In order to minimize soot deposition on the end of the element which is presented to the combustion space, it is essential to ensure that the end of the element is recessed below the wall of the combustion space. If the distance is too great then cleaning of the end of the element by the natural scrubbing action of the gas within the combustion space will be lost. On the other hand if the distance is too small there is a risk of deposition of soot. The actual distance between the end of the element and the wall of the combustion space may lie between 3 mm and 12 mm depending on the design of the combustion space. The inner end of the opening 12 may be positioned close to the path of the fuel spray within diesel combustion chamber providing the end of the element is set back as mentioned above.

The sensor 22 has been described as a photo diode and this may be sensitive to visible or infra-red light. It may however be formed from a pyro-electric material and it may comprise a more complex semi-conductor device, a low mass thermocouple or some other device capable of sensing electromagnetic radiation which is given off during the combustion process. In the case where the sensor is responsive to infra-red, the element 20 may be formed from silicon.

The signal obtained from the sensing device can be processed in any convenient form of processing circuit to provide a number of signals representative of combustion. For example, it is possible to obtain a signal indicative of the start of combustion and further signals since the sensor is observing the combustion process in its entirety, signals indicative of the level of combustion.

We claim:

1. A sensing device for attachment to an internal combustion engine whereby an electrical signal can be obtained indicative of combustion of fuel in a combustion space of the engine comprising in combination, a tubular body part adapted to be secured within an opening in an engine wall, the opening communicating with the combustion space, a radiation conductive element extending within a bore defined by the tubular body part, a sealing lining located between the surface of said element and the wall of the bore, said lining acting to retain the element in the bore and to prevent egress of gases from the combustion space, and a sensor mounted on the end of the element which is remote from the combustion space in use, said sensor having a central area in intimate contact with the entire end of said element and having a peripheral area overlapping said end and secured thereto by a fillet joint extending from said peripheral area to a longitudinal side of said element, said sensor being responsive to the radiation transmitted by the element, the other end of the element in use, being exposed to the combustion space, wherein said lining is formed from a visco-elastic material whereby the lining also acts to cushion the element against vibration and shock.

2. A device according to claim 1 in which said material is a silicone rubber.

3. A device according to claim 1 in which the other end of said element is located against a step defined in the bore.

4. A device according to claim 1 in which said sensor is cemented to the one end of said element.

5. A device according to claim 4 in which said sensor comprises a photo-diode having a light opening facing the end of the element.

6. A device according to claim 1 in which said element is formed from quartz, the element having flame polished end surfaces.

7. An internal combustion engine including a sensing device as claimed in claim 1 in which the tubular body part is located in the opening so that the other end of the element is set back from the entrance to the opening from the combustion space by a distance within the range 3–12 mm.

* * * * *